Dec. 2, 1924.  W. MORRISON  1,517,574
MACHINE FOR CLOSING IN ROLLER BEARING CAGES
Filed April 19, 1924
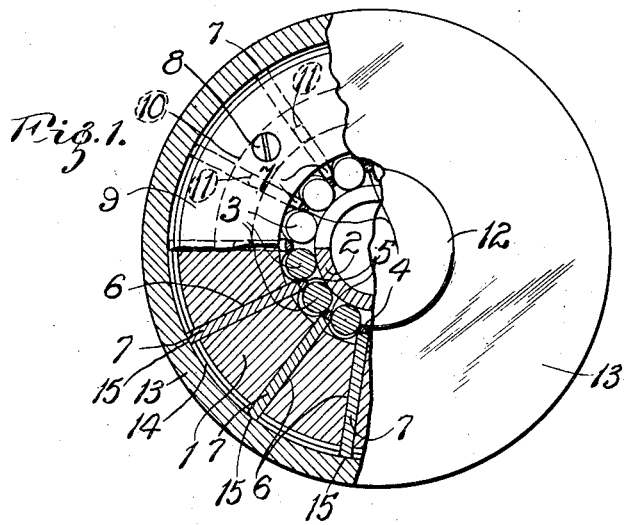
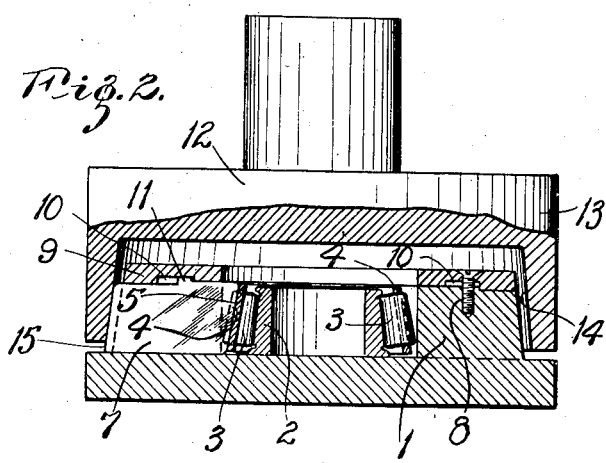
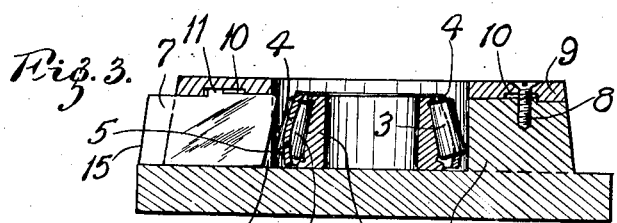
Inventor:
Walter Morrison
by Curtis Davis
His Attorneys Patented Dec. 2, 1924.

1,517,574

UNITED STATES PATENT OFFICE.

WALTER MORRISON, OF CANTON, OHIO, ASSIGNOR TO THE TIMKEN ROLLER BEARING COMPANY, OF CANTON, OHIO, A CORPORATION OF OHIO.

MACHINE FOR CLOSING IN ROLLER-BEARING CAGES.

Application filed April 19, 1924. Serial No. 707,571.

*To all whom it may concern:*

Be it known that I, WALTER MORRISON, a citizen of the United States, and a resident of the city of Canton, in the county of Stark and State of Ohio, have invented a new and useful Improvement in Machines for Closing In Roller-Bearing Cages, of which the following is a specification.

My invention relates to machine for closing in the cages of roller bearings, whereby the cages are changed from a bowed condition to conical form, so as to properly retain the conical rolls in position on the cone or inner bearing member. The invention has for its principal object a machine that is simple and easy to operate and that has few parts to get out of repair. The invention consists principally in mounting a plurality of fingers in radially extending slots in a die and providing a reciprocating member adapted to engage the ends of said fingers to force them inwardly against the cage of a roller bearing disposed centrally thereof. The invention further consists in the machine and in the parts and combinations of parts hereinafter described and claimed.

In the accompanying drawing which forms part of this specification and wherein like reference characters indicate like parts in the several views, Fig. 1 is a top plan view of a closing in machine embodying my invention, a portion being broken away, so as to show certain parts in horizontal section, Fig. 2 is a vertical sectional view, a portion of the upper member of the device being shown in elevation, and Fig. 3 is a sectional view similar to Fig. 2 showing the operating fingers in their outermost positions and a cage in bowed condition.

A suitable die 1 is provided with a central depression that is adapted to receive an assembled roller bearing cone 2, rolls 3 and cage 4. In order to permit the rolls to slip over the rib on the end of the cone and into the cage pockets, the cage is bowed "outwardly", as shown in Fig. 3; and in order to properly position the rolls and retain them on the cone, it is then necessary to close in the cage, that is, bring it into conical form by straightening up each of the bridges 5 that constitute the side walls of the roll holding pockets.

According to my invention, the die 1 is provided with radially extending slots 6, in each of which is disposed a finger 7 that has its inner end beveled or inclined to conform to the inclination desired for the bridges 5 of the cage 4 of the roller bearing. The fingers are angularly spaced to conform to the spacing of the bridges of the cage.

Secured to the top of the die 1, as by screws 8, is a retaining ring 9 that is provided with an annular slot 10 on the underside thereof. Each finger 7 has a projecting lug 11 that extends into said slot 10. Thus, the stroke of the fingers 7 is limited and the fingers cannot be removed from the die except by unscrewing and removing the retaining ring 9.

A plunger 12 is disposed above the die 1. The enlarged head 13 of said plunger is provided with a conical socket 14 therein. The outer ends 15 of the cage closing fingers 7 are beveled or inclined to cooperate with the conical surface of the socket 14 of the plunger 12; and as the plunger descends, the fingers 7 are forced inwardly by the action of the conical portion 14 of the plunger against the inclined ends 15 of the fingers 7.

The operation of the device is as follows:

The assembled roller bearing is seated in the central depression in the die so that each bridge 5 of the bearing cage 4 is in alinement with one of the fingers 7. Then the plunger is lowered and as it engages the ends of the fingers 7, it forces them radially inward against the bridges 5, thus straightening the bridges and closing in the cage. Obviously, the stroke of the fingers 7 may be adjusted to any desired length merely by varying the stroke of the plunger.

Ordinarily, the edges of the bridges of the cage are broken down or "winged" prior to the assembling operation. At times, however, the cage may merely be perforated, the bridges remaining substantially rectangular in cross section. In such case, the bridges are forced against the sides of the rollers and are shaped to the rollers by the closing in operation.

The herein described machine is simple and easy to operate. As shown in the drawings, the roller bearing is seated in the die with its small end uppermost; and as the bearing is removed from the die, the fingers are forced outwardly. This makes it unnecessary to provide stripping springs to force the fingers outwardly; but, of course, such springs may be used, if desired. If the cage were seated in the die with the bearing disposed with its large end uppermost, it might be desirable to use such stripping springs, although they would not be essential.

My fixture has very few parts and those parts are strongly built and not likely to get out of order. In case one finger breaks, it can easily be replaced. Obviously numerous changes may be made without departing from the invention, and I do not wish to be limited to the precise construction shown.

What I claim is:

1. A machine for closing in roller bearing cages, comprising a die having a central depression adapted to receive a conical roller bearing, a plurality of fingers mounted in said die, said fingers being angularly spaced to conform to the spacing of the bridges of the cage of the roller bearing, and a plunger for operating on the outer ends of said fingers to force them radially inward against the bridges of the cage.

2. A machine for closing in roller bearing cages comprising a die having a central depression adapted to receive a conical roller bearing, a plurality of fingers disposed in said die, said fingers having inclined outer ends, said fingers being angularly spaced to conform to the spacing of the bridges of the cage of the roller bearing and a plunger having a conical depression therein adapted to engage the inclined ends of said fingers to operate them.

3. A machine for closing in roller bearing cages comprising a die having a central depression adapted to receive a conical roller bearing, a circular series of fingers disposed in radially extending slots provided therefor in said die, said fingers having inclined outer ends, each of said fingers being angularly spaced to conform to the spacing of the bridges of the cage of the roller bearing, and a plunger movable endwise to force said fingers radially inward, said plunger having a conical socket therein adapted to cooperate with the inclined ends of said fingers to force them radially inward.

4. A machine for closing in roller bearing cages, comprising a die having a central depression adapted to receive a conical roller bearing, a plurality of fingers disposed in slots provided therefor in said die, said fingers being angularly spaced to conform to the spacing of the bridges of the cage of the roller bearing, a ring secured to the top of said die, said ring having an annular slot in its under surface, said fingers being provided with lugs that extend into said slot, and means for operating said fingers.

Signed at Canton, Ohio, this 14" day of April, 1924.

WALTER MORRISON.